June 8, 1965  H. J. FRÄNKEL ETAL  3,187,390
WIDE SLIT FLOW NOZZLE
Filed Oct. 21, 1963

INVENTORS:
HELMUT J. FRAENKEL
WILHELM L. P. REINHARDT
BY:
THEIR ATTORNEY

United States Patent Office 3,187,390
Patented June 8, 1965

3,187,390
WIDE SLIT FLOW NOZZLE
Helmut J. Fränkel, Kelkheim, near Frankfurt, and Wilhelm L. P. Reinhardt, Wesseling Bezirk Cologne, Germany, assignors to Shell Oil Company, New York, N.Y., a corporation of Delaware
Filed Oct. 21, 1963, Ser. No. 317,514
Claims priority, application Netherlands, Oct. 22, 1962, 284,573
8 Claims. (Cl. 18—12)

This invention relates to a flow-nozzle for preparing films. More particularly, this invention relates to a flow-nozzle with an elongated, slit-shaped discharge opening from which a film or layer of viscous material, for example a resin or a polymer, may be discharged at an equal rate over the entire length of the slit.

Films are customarily prepared by extruding the film-forming material through a discharge or extrusion opening onto a smooth surface, such as an endless belt, for the collection and cooling of the material. It is extremely important, for commercial reasons, that the films or layers of material be of uniform thickness. As long as the parameters in the flow-nozzle, i.e., pressure, viscosity of the material, supply of material, etc., remain constant, the material will be discharged from the flow-nozzle at a constant rate and will result in a layer of material of uniform thickness. In the event, however, that one parameter in the flow-nozzle should change, then in order to maintain a constant discharge from the flow-nozzle, means must be provided for adjusting the flow of the material to compensate for the change.

It is therefore a primary object of this invention to provide a flow-nozzle for preparing films or layers of material whereby the rate of discharge of the material from the flow-nozzle may be controlled.

It is a further object of this invention to provide an improved flow-nozzle for the preparation of layers of material of a uniform thickness.

It is still a further object of this invention to provide a flow-nozzle for the preparation of layers of material of uniform thickness, wherein the discharge of material from the flow-nozzle may be continually controlled in a rapid, reliable and accurate manner.

Briefly, the above objects of the invention are attained by providing a flow-nozzle having an elongated chamber with a slit-shaped discharge opening extending along substantially the entire length of the bottom of the elongated chamber. A discharge flow control element, which is movable in a plane normal to the discharge opening is suspended below the entire length of the discharge opening. The upper edge of the control element is located along the longitudinal axis of the discharge opening and may be extended into the discharge opening thereby leaving a slit-shaped passage on each side of the control element. The position of the control element is preferably controlled by a transducer which produces a signal proportional to the thickness of the layer of material discharged from the discharge opening.

When the flow-nozzle according to the invention is in use, the liquid mass of material is divided by the control element into two separate streams which leave the nozzle through the passages situated in the discharge opening on either side of the control element. In order to maintain a smooth control of the discharge of material, the cross-section of the upper or upstream edge of the control element is preferably conical or wedge-shaped.

The cross-section of the control element is preferably also conical at the downstream end, whereby the layers of material flowing past each side of the upstream section of the control element may readily unite to form a single layer. The conicity should of course be such that, taking into account the properties of the material during the discharge, the material may readily follow the flanks of the bottom conical section. Preferably both flanks converge to form a sharp edge, thus producing a wedge-shaped cross-section for the downstream edge of the control element, whereby both streams of material unite without occluding air.

The attractive feature of the flow-nozzle according to the invention is that, when the nozzle is in use, the control element hardly contacts the edges of the flow-nozzle. In fact, the control element is entirely freely suspended along its longitudinal axis and is only in contact with the edges of the discharge opening at the very narrow ends. Hence the sealing between the control element and the edges of the discharge opening presents no problem. In general, special provisions for sealing may even be omitted, since any leakage which does occur can only take place at the narrow sides of the control element. This means that not only is the chance of leakage slight but, should leaking occur, the quantity of leaking liquid is negligible as compared with the quantity normally discharged through the flow-nozzle, thereby allowing the quantity of material being discharged to be accurately controlled. In addition, the adjustment of the control element requires little force as a result of the small friction area between this element and the inner wall of the flow-nozzle. The necessity of only a small force for control purposes is particularly important when the nozzle is used for sticky substances, such as, for example, resins.

The above objects and advantages of the invention will be more readily understood from the following description of the invention taken in conjunction with the accompanying drawing wherein.

Figure 1:
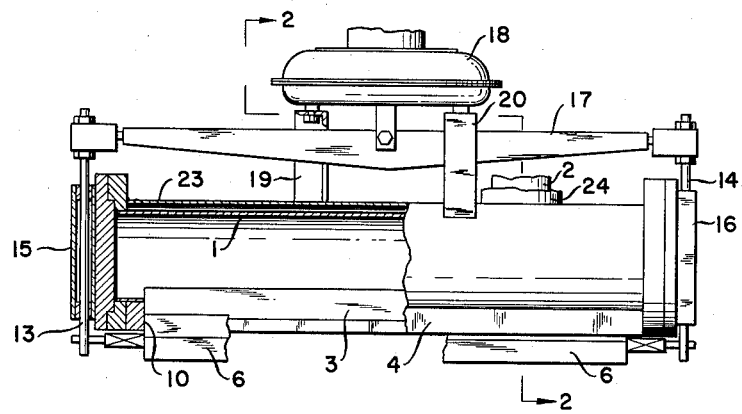
FIGURE 1 is a front view, partly sectional of the flow-nozzle according to the invention.
Figure 2:
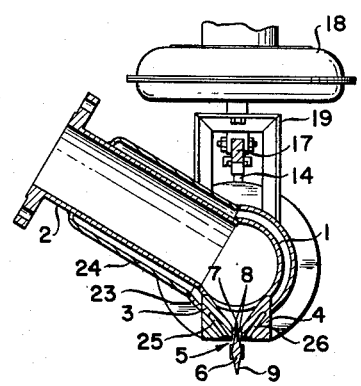
FIGURE 2 is a cross-sectional view of the flow-nozzle taken along the line 2—2 of FIGURE 1.

Referring now to FIGURES 1 and 2, the flow-nozzle comprises a relatively long chamber or distribution pipe 1, to which is connected a feed pipe 2 for the supply of the material. Along the bottom of the distribution pipe 1 are fastened, e.g. by welding, a pair of discharge lips 3 and 4 defining therebetween a slit-shaped discharge opening 5. Below the discharge opening and centrally located between the discharge lips 3 and 4 is a control element 6 having its longitudinal axis parallel to the longitudinal axis of the discharge opening 5. The control element 6, which is of constant cross-section, extends over the entire length of the discharge opening 5 and has its upstream or upper edge 7 sufficiently tapered so that it can extend into the discharge opening 5 and form a pair of slit-shaped fluid passages 8, one on each side of the control element 6. The lower or downstream edge 9 of control element 6 is also preferably wedge-shaped in order to prevent any air getting into the discharged layer of material.

As can be seen from the drawing, when the flow-nozzle is in use, i.e., discharging a layer of material, the control element 6 is free of any contact with the discharge lips 3 and 4 and only contacts the surfaces forming the discharge opening 5 at its ends 10. Since this contact area is small, little force is necessary to overcome the friction at these surfaces thus allowing easy and accurate adjustment of the control element.

Fastened to the ends of the control element 6, are a pair of guide rods 13 and 14 which are slidably movable in respective guides 15, 16 fastened to the ends of the distributor pipe 1. The guide rods 13, 14 are suspended from a yoke 17, which in turn is connected to an adjusting device 18 mounted on the distributor pipe by means of brackets 19 and 20. The adjusting device 18, which may be any type of mechanism whose output is a linear motion, e.g. a pneumatic bellows, moves the yoke 17 and consequently the guide rods 13 and 14 and the control element 6, up or down, i.e., normal to the plane of the discharge opening 5, in response to an input signal which may be produced either manually or automatically in accordance with a variable which is to be controlled, e.g. the thickness of the discharge layer of material.

In the event that it is required to control the temperature of the liquid material flowing through the nozzle, e.g. when the material is an epoxy resin in a hot liquid condition, the flow-nozzle may be provided with jackets 23 and 24 which surround the distributor pipe 1 and the feed pipe 2 respectively. The space between the jackets and their respective enclosed portions of the flow-nozzle may then be filled with a suitable heating or cooling agent such as steam, water or oil. Normally, however, a heating agent is used. Similarly, the discharge lips 3 and 4 may also be provided with channels 25 and 26 respectively which are filled with the heating or cooling agent. The heating or cooling agent will thus prevent the exchange of heat between the material within the flow-nozzle and surrounding atmosphere. It should be noted that there is substantially no exchange of heat between any material being discharged from the flow-nozzle and the control element 6. This results from the fact that the control element 6 is almost entirely surrounded by the discharging material and consequently the control element assumes the same temperature as the discharging material. Hence, it is sufficient to arrange the heating or cooling means exclusively in the immovable portions of the nozzle.

When the flow-nozzle is being used, the hot, viscous liquid is supplied under pressure to the distributor pipe 1 via the feed pipe 2, after which it passes between the discharge lips 3 and 4 and leaves the nozzle through the discharge opening 5. The dimensions of the distributor pipe 1 and the discharge opening 5 are such that the material flows out at the same rate over the entire length of the discharge opening 5. In the position shown in the drawing, the control element 6 has been adjusted to a position such that it does not entirely close the discharge opening 5, so that the viscous material is discharged from the flow-nozzle through both slit-shaped passages 8 situated between the control element 6 and the discharge lips 3 and 4. As a result of the adhesion between the liquid material and the control element 6, the streams of material on both sides of the control element 6 continue to follow the contours of the latter until the sharp end of the downstream edge 9 of the control element, where both streams reunite to form a single layer without occluding air.

In order to harden the layer of hot viscous material discharged from the flow-nozzle, the discharged material is collected on a moving surface, for example, an endless, steel cooling belt 27 (FIGURE 3), against the underside of which a cooling liquid may be sprayed.

The discharge of material from the nozzle is controlled by adjusting the control element 6 by means of the yoke 17 and the guide rods 13, 14. In this way the width of the slit-shaped passages 8 is increased or decreased according as the control element 6 is moved upward or downward. It should be noted that the control element 6 may be adjusted to entirely close the discharge opening 5 or be arranged entirely below the plane of the discharge opening 5, thereby allowing the combined width of the passages 8 to be adjusted from 0–100% of the width of the discharge opening 5.

Figure 3:
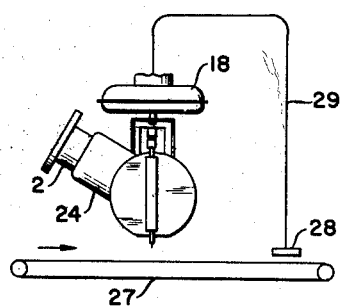
FIGURE 3 is a diagrammatic view of an automatically controlled film-forming apparatus embodying a flow-nozzle according to the invention.

In order to maintain the thickness of the layer of material discharged from the flow-nozzle at a constant value, the control element 6 may be automatically adjusted to vary the flow from the nozzle in the manner shown in FIGURE 3. In order to detect any variations in thickness of the layer of material on the belt 27, a thickness measuring transducer 28 is positioned adjacent to the moving belt. Such transducers are old and well known in the measuring art and per se forms no part of applicants' invention. The output signal from the transducer 28, which is proportional to the thickness of the layer of material on the belt 27, is then coupled by means of line 29 to the input of the adjusting device 18 which positions the control element 6 in accordance with the transducer output signal. In order to make the control system as simple as possible, the output signal from the transducer is a pneumatic signal, thereby permitting the use of a simple pneumatic bellows for the adjusting device 18.

Obviously various modifications of the present invention are possible in view of the above teachings. It is therefore to be understood that the invention is not limited to the particular form illustrated, but is capable of embodiment in other forms without departing from the spirit and scope of the appended claims.

We claim as our invention:

1. A flow nozzle from which uniform layers of a viscous material may be prepared comprising:
   an elongated chamber having a slit-shaped discharge opening extending along the length of the bottom of said chamber;
   an inlet for supplying a stream of viscous material to said chamber;
   an adjustable flow control element mounted externally of said elongated chamber and extending along the entire length of said discharge opening below said chamber, said control element having its upper end extending into said discharge opening to divide said discharge opening into a pair of openings, one on each side of said control element, thereby causing the material discharged from said chamber to flow along said control element; and,
   means mounted externally of said elongated chamber for imparting motion to said flow control element in a plane normal to the plane of said discharge opening in order to vary the flow rate of the material being discharged from said elongated chamber.

2. The flow nozzle of claim 1 wherein the lower edge of said control element has a wedge-shaped cross-section.

3. The flow nozzle of claim 1 wherein the upper edge of said control element has a wedge-shaped cross-section.

4. The flow nozzle of claim 2 wherein the upper edge of said control element has a wedge-shaped cross-section.

5. The flow nozzle of claim 1 including means for controlling the temperature of the material in said nozzle arranged exclusively in the immovable portions of said nozzle.

6. The flow nozzle of claim 1 including:
   a moving surface positioned below said nozzle for collecting the layer of material discharged from said nozzle;
   transducer means positioned along said movable surface for detecting the thickness of the layer of material on said surface;
   and, means coupling the output of said transducer means to said means for moving said flow control element, whereby said flow control element will be positioned in accordance with the thickness of the layer of material on the moving surface.

7. The flow nozzle of claim 4 including:
   a moving surface positioned below said nozzle for collecting the layer of material discharged from said nozzle;
   transducer means positioned along said movable surface for detecting the thickness of the layer of material on said surface;
   and, means coupling the output of said transducer means to said means for moving said flow control element, whereby said flow control element will be positioned in accordance with the thickness of the layer of material on the moving surface.

8. A flow nozzle from which uniform layers of a viscous material may be prepared comprising:
- an elongated chamber having a slit-shaped discharge opening extending along the length of the bottom of said chamber;
- an inlet for supplying a stream of viscous material to said chamber;
- a flow control element movably mounted externally of said chamber and extending along the entire length of said discharge opening, said control element having upper and lower edges which are of wedge-shaped cross-section; and
- means mounted externally of said chamber for moving the upper edge of said control element into and out of said discharge opening to vary the flow rate of the viscous material being discharged from said chamber.

References Cited by the Examiner
UNITED STATES PATENTS

| | | | |
|---|---|---|---|
| 2,274,432 | 2/42 | Repsher et al. | 18—15 |
| 3,024,404 | 3/62 | Ziffer | 18—21 |
| 3,122,784 | 3/64 | Jolliffe | 18—12 |

WILLIAM J. STEPHENSON, *Primary Examiner.*

MICHAEL V. BRINDISI, *Examiner.*